US006189790B1

(12) United States Patent
Walter

(10) Patent No.: US 6,189,790 B1
(45) Date of Patent: Feb. 20, 2001

(54) METHOD AND APPARATUS FOR DISPLAYING INSTRUCTIONAL MESSAGES DURING OPERATION OF A SELF-SERVICE CHECKOUT TERMINAL

(75) Inventor: Joanne S. Walter, Alpharetta, GA (US)

(73) Assignee: NCR Corporation, Dayton, OH (US)

( * ) Notice: Under 35 U.S.C. 154(b), the term of this patent shall be extended for 0 days.

(21) Appl. No.: 09/469,996

(22) Filed: Dec. 22, 1999

(51) Int. Cl.[7] .................................................... G06K 15/00
(52) U.S. Cl. ............................................... 235/383; 186/61
(58) Field of Search ................................ 235/383; 186/61

(56) References Cited

U.S. PATENT DOCUMENTS 4,688,105 * 8/1987 Bloch et al. ......................... 235/383
5,967,264 * 10/1999 Lutz ....................................... 186/61

* cited by examiner

*Primary Examiner*—Harold I. Pitts
(74) *Attorney, Agent, or Firm*—Maginot, Addison & Moore

(57) ABSTRACT

A method of operating a retail terminal having a display monitor associated therewith includes the step of generating an item-entered control signal when a user enters an item for purchase into the retail terminal during a retail transaction. The method also includes the step of entering a record corresponding to the item for purchase into an electronic transaction table in response to generation of the item-entered control signal. The method further includes the step of generating an instructional message which instructs the customer on operation of the self-service checkout terminal during the retail transaction. The message generating step includes the step of displaying an animated character and an associated instructional text message with the display monitor during the retail transaction. The animated character is configured to resemble a commercially recognizable image so as to communicate the commercially recognizable image to the customer with the display monitor. A self-service checkout terminal is also disclosed.

23 Claims, 6 Drawing Sheets

32

METHOD AND APPARATUS FOR DISPLAYING INSTRUCTIONAL MESSAGES DURING OPERATION OF A SELF-SERVICE CHECKOUT TERMINAL

TECHNICAL FIELD OF THE INVENTION

The present invention relates generally to a retail checkout terminal, and more particularly to a method and apparatus for displaying instructional messages during operation of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for the retail clerk. In particular, a self-service checkout terminal is a system which is operated by a customer without the aid of the retail clerk. What is meant herein by the term "customer" is a person who enters the retailer's store, selects his or her items for purchase from the shopping area of the store, checks out his or items for purchase by use of a self-service checkout terminal (including tendering payment for his or her items for purchase), and then exits the store subsequent to completion of his or her transaction. Hence, as used herein, a customer is distinguished from a retail clerk or other employee of the retailer in that a customer enters the retailer's store for the sole purpose of purchasing items from the store.

Hence, it should be appreciated that in regard to operation of a self-service checkout terminal, the customer scans individual items for purchase across a scanner or weighs items with a product scale and thereafter places the items into a grocery bag, if desired. The customer then pays for his or her purchases either at the self-service checkout terminal if so equipped, or at a central payment area which is staffed by a store employee. Thus, a self-service checkout terminal permits a customer to select, itemize, and in some cases pay for his or her purchases without the assistance of the retailer's personnel.

In general, a customer may have little or no training in the operation of the self-service checkout terminal prior to his or her initial use thereof. Hence, it is generally desirable to provide the customer with a number of instructions which facilitate the customer's use of the self-service checkout terminal. For example, in the case of the operation of a product scanner, it is desirable to instruct the customer as to when the terminal is ready to have item information input through the scanner.

However, heretofore utilized instructional screens are often difficult for the customer to understand thereby rendering the customer reluctant to use the terminal. If this causes a store employee to constantly be required to assist customers in regard to operation of the terminal, the labor savings associated with operation of the self-service checkout terminal are not realized.

What is needed therefore is a retail checkout terminal which overcomes one or more of the above-mentioned drawbacks. What is particularly needed is a self-service checkout terminal which provides instruction to a customer in order to facilitate the customer's operation of the retail checkout terminal in a "user friendly" manner.

SUMMARY OF THE INVENTION

In accordance with a first embodiment of the present invention, there is provided a method of operating a retail terminal having a display monitor associated therewith. The method includes the step of generating an item-entered control signal when a customer enters an item for purchase into the retail terminal during a retail transaction. The method also includes the step of entering a record corresponding to the item for purchase into an electronic transaction table in response to generation of the item-entered control signal. The method further includes the step of generating an instructional message which instructs the user on operation of the retail terminal during the retail transaction. The instructional message generating step includes the step of displaying an animated character and an associated instructional text message with the display monitor during the retail transaction.

In accordance with a second embodiment of the present invention, there is provided a retail terminal. The retail terminal includes a display monitor, a scanner for entering an item for purchase into the retail terminal, and a processing unit which is electrically coupled to the display monitor and the scanner. The retail terminal further includes a memory device electrically coupled to the processing unit, which has stored therein a plurality of instructions which, when executed by the processing unit, causes the processing unit to: (1) generate an item-entered control signal when a customer enters an item for purchase into the retail terminal during a retail transaction, (2) enter a record corresponding to the item for purchase into the electronic transaction table in response to generation of the item-entered control signal, and (3) generate an instructional message which instructs the user on operation of the retail terminal during the retail transaction. The instructional message includes an animated character and an associated instructional text message which are displayed with the display monitor during the retail transaction.

In accordance with a third embodiment of the present invention, there is provided a method of operating a self-service check out terminal having a display monitor associated therewith. The method includes the step of generating an item-entered control signal when a customer enters an item for purchase into the retail terminal during a retail transaction. The method also includes the step of entering a record corresponding to the item for purchase into an electronic transaction table in response to generation of the item-entered control signal. The method further includes the step of generating an instructional message which instructs the customer on operation of the self-service checkout terminal during the retail transaction. The message generating step includes the step of displaying an animated character and an associated instructional text message with the display monitor during the retail transaction. The animated character is configured to resemble a commercially recognizable image so as to communicate the commercially recognizable image to the customer with the display monitor.

In accordance with a fourth embodiment of the present invention, there is provided a method of operating a retail terminal having a display monitor associated therewith. The method includes the step of generating an item-entered control signal when a customer enters an item for purchase into the retail terminal during a retail transaction. The method also includes the step of entering a record corresponding to the item for purchase into an electronic transaction table in response to generation of the item-entered control signal. The method further includes the step of generating an instructional message which instructs the user on operation of the retail terminal during the retail transaction. The instructional message generating step includes the steps of (1) displaying an animated character with the display monitor during the retail transaction, and (2) generating an associated instructional audio message during the animated character displaying step.

It is therefore an object of the present invention to provide a new and useful retail checkout terminal.

It is also an object of the present invention to provide a new and useful method of operating a retail checkout terminal.

It is moreover an object of the present invention to provide an improved retail checkout terminal.

It is further an object of the present invention to provide an improved method of operating a retail checkout terminal.

It is yet another object of the present invention to provide a retail checkout terminal which provides user friendly instruction to a customer in order to facilitate operation of the terminal.

It is further an object of the present invention to provide a retail checkout terminal which provides instruction to a customer while also conveying an advertising message to the customer.

The above and other objects, features, and advantages of the present invention will become apparent from the following description and the attached drawings.

DETAILED DESCRIPTION OF THE INVENTION

Figure 1:
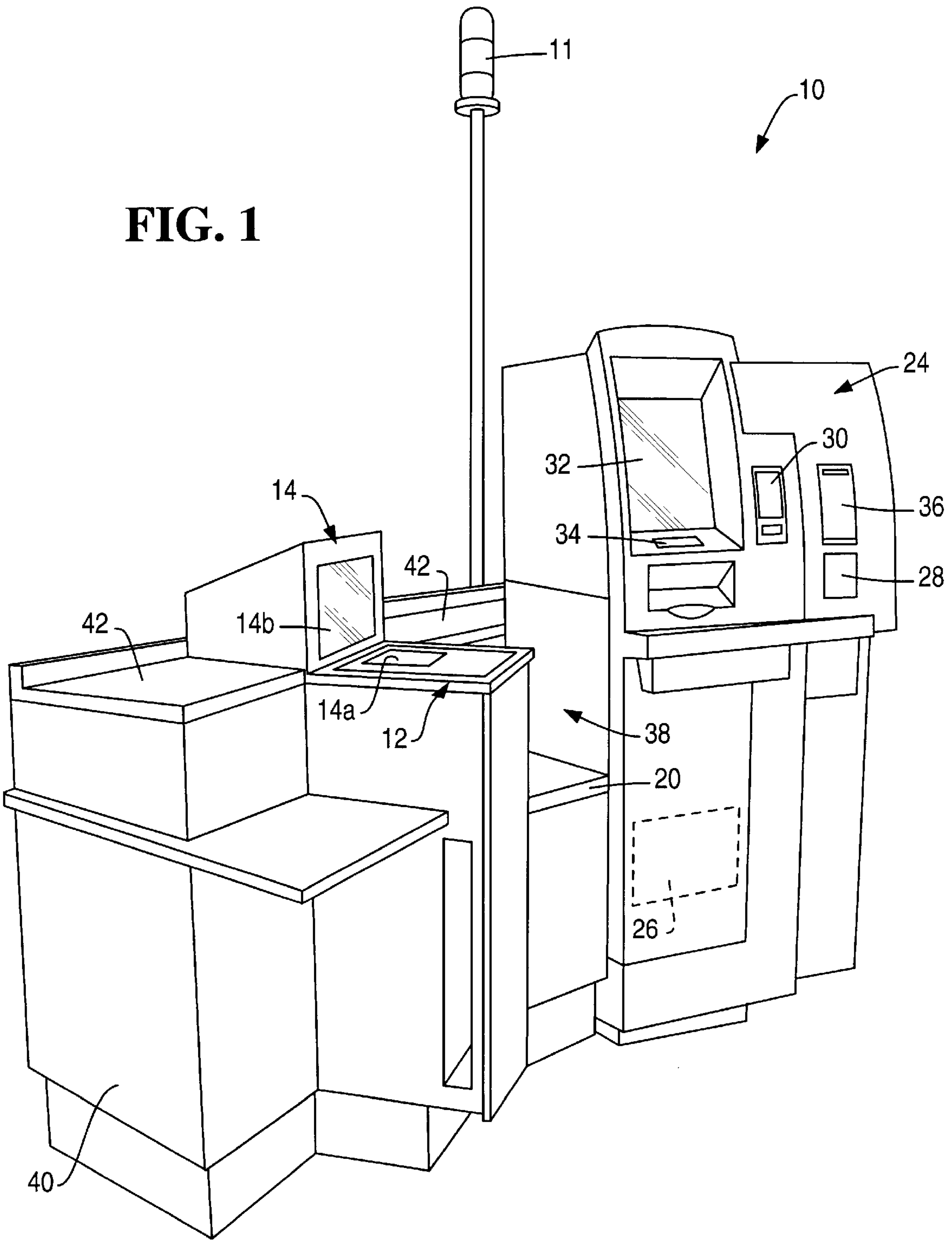
FIG. 1 is a perspective view of a self-service checkout terminal which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown a self-service checkout terminal 10 for use in a retail business such as a grocery store. The self-service checkout terminal 10 includes a product scale 12, a scanner 14, a bagwell scale 20, a card reader 30, a display monitor 32, a keypad 34, a printer 36, and a processing unit 26. The card reader 30, the display monitor 32, the keypad 34, and the printer 36 may be provided as separate components, or alternatively may preferably be provided as components of an automated teller machine (ATM) 24.

The self-service checkout terminal 10 also includes a bagwell 38 for accommodating one or more grocery bags (not shown) and a base 40 having a counter 42 secured thereto. The counter 42 defines an arcuate surface as shown in FIG. 1. Such an arcuate surface allows the scanner 14 to be positioned relatively close or otherwise proximate the ATM 24 and hence the components associated therewith. Such a configuration facilitates a user's (e.g. customer's) use of the self-service checkout terminal 10. Moreover, the bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14*a* and a second scanning window 14*b*. The first scanning window 14*a* is disposed in a substantially horizontal manner, whereas the second scanning window 14*b* is disposed in a substantially vertical manner, as shown in FIG. 1. The product scale 12 is integrated with the scanner 14. More specifically, the product scale 12 is disposed substantially parallel to the scanning window 14*a* thereby enveloping the scanning window 14*a*. If an item such as produce is placed upon the product scale 12 or the first scanning window 14*a*, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item).

The display monitor 32 displays instructions which serve to guide a customer through a checkout procedure. For example, an instruction is displayed on the display monitor 32 which instructs the customer to enter an item into the self-service checkout terminal 10 by either passing the item over the scanner 14, or placing the item on the product scale 12 in order to obtain the weight of the item. The display monitor 32 is preferably a known touch screen monitor which can generate data signals when certain areas of the screen are touched by the customer.

As will be discussed below in more detail, if a customer has difficulty in operation of the checkout terminal 10, the display monitor 32 may be utilized to display instructional messages to the customer. Moreover, such instructional messages may also include an advertising message in order to entice a customer to purchase additional items.

The status light device 11 is provided in order to notify store personnel, such as a customer service manager, that intervention into the customer's transaction is needed. In particular, the status light device 11 may display a first colored light (e.g. yellow) in order to notify store personnel that intervention is needed prior to the end of the customer's transaction. Alternatively, the status light device 11 may display a second colored light (e.g. red) in order to notify store personnel that intervention is needed immediately.

The bagwell scale 20 is a weight scale which monitors the weight of items placed in the bagwell 38 (i.e. into a grocery bag) or onto the portion of the counter 42 which is located proximate the bagwell 38. It should be appreciated that a customer may place an item onto the portion of the counter 42 proximate the bagwell 38 subsequent to entering the item, but prior to placing the item into a grocery bag. For example, if a customer scans a loaf of bread, the customer may want to place the bread onto the portion of the counter 42 proximate the bagwell 38 until one of the grocery bags is nearly full thereby preventing the bread from being crushed. Hence, the bagwell scale 20 may be utilized to monitor the ingress and egress of items into and out of the bagwell 38 along with onto and off of the counter 42. Such monitoring is particularly useful for preventing items which have not been scanned from being placed into a grocery bag.

Figure 2:
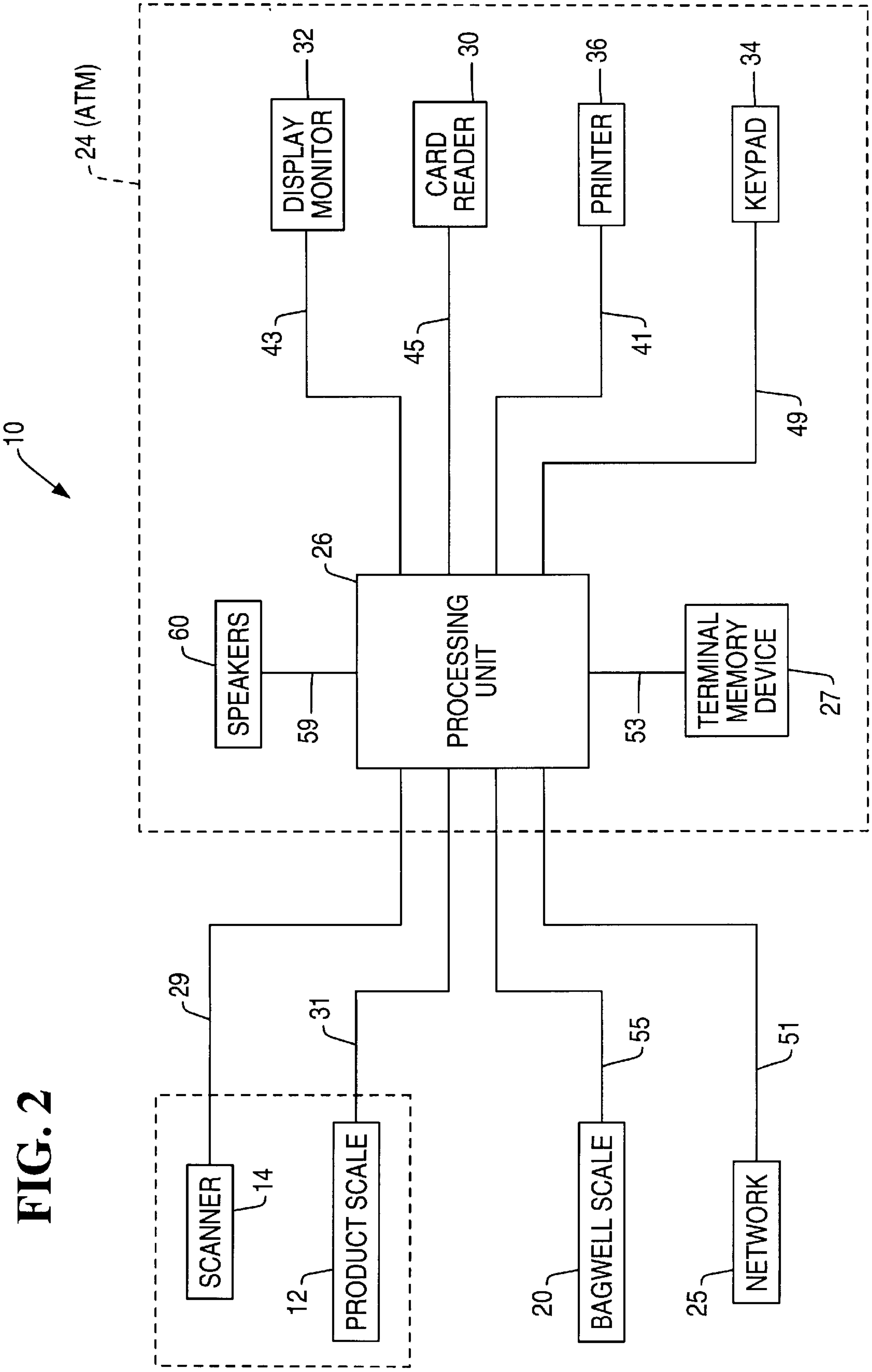
FIG. 2 is a simplified block diagram of the self-service checkout terminal of FIG. 1.

Referring now to FIG. 2, there is shown a simplified block diagram of the self-service checkout terminal 10. The processing unit 26 has a terminal memory device 27 associated therewith and is electrically coupled to the product scale 12, the scanner 14, the bagwell scale 20, the card reader 30, the display monitor 32, the keypad 34, and the printer 36. The processing unit 26 is also electrically coupled to a network 25 such as the retailer's LAN or WAN.

The processing unit 26 monitors output signals generated by the scanner 14 via a data communication line 29. In particular, when the customer scans an item which includes a product identification code across the scanning windows 14*a*, 14*b*, an output signal indicative of the product identification code is generated on the data communication line 29.

The processing unit 26 is coupled to the product scale 12 via a data communication line 31. In particular, when a customer places an item on the product scale 12, the product scale 12 generates an output signal on the data communication line 31 which is indicative of the weight of the item.

The processing unit 26 is coupled to the bagwell scale 20 via a data communication line 55. In particular, when a customer places an item into one of the grocery bags or onto the portion of the counter 42 proximate the bagwell 38, the bagwell scale 20 generates an output signal on the data communication line 55 which is indicative of the weight of the items placed in the grocery bags and/or on the portion of the counter 42 proximate the bagwell 38. Similarly, when a customer removes an item from one of the grocery bags or takes an item off of the portion of the counter 42 proximate the bagwell 38, the bagwell scale 20 generates an output signal on the data communication line 55 which is indicative of the weight of the items removed from the grocery bags and/or taken off of the portion of the counter 42 proximate the bagwell 38.

The processing unit 26 communicates with the display monitor 32 through a data communication line 43. The processing unit 26 generates output signals on the data communication line 43 which cause various instructional messages and transaction data to be displayed on the display monitor 32. In addition, as shall be discussed below in more detail, the display monitor 32 is operated to display various animated characters to provide assistance during operation of the retail terminal 10.

As alluded to above, the display monitor 32 may include known touch screen technology which can generate output signals when the customer touches a particular area of the display screen associated with the display monitor 32. The signals generated by the display monitor 32 are transmitted to the processing unit 26 via the data communication line 43. It should be appreciated that various instructional messages and transaction data may also be communicated via other devices in addition to or in lieu of the display monitor 32. For example, instructional messages may be generated with a voice generating device (not shown) or an audible tone generating device (not shown).

The keypad 34 is coupled to the processing unit 26 through a data communication line 49. The keypad 34 may include one or more of a known keypad or a touch pad. It should be appreciated that the touch screen associated with the display monitor 32 and the keypad 34 define input devices which may be utilized by a customer to input information associated with operation of the self-service checkout terminal 10. It should also be appreciated that numerous other input devices may also be utilized by the customer to input information associated with operation of the self-service checkout terminal 10.

Moreover, the card reader 30 is coupled to the processing unit 26 through a data communication line 45. The card reader 30 may include a known credit, debit, loyalty, and/or smart card reader which is capable of reading information stored on the customer's card.

The printer 36 is coupled to the processing unit 26 via a data communication line 41. The printer 36 is provided to, for example, print receipts for the customer at the conclusion of his or her checkout transaction.

A pair of speakers 60 are coupled to the processing unit 26 via a data communication line 59. Instructional messages that are generated by the voice generating device are communicated to the speakers 60 via the communication line 59 and thereafter broadcast to the customer to assist the customer in the use of the retail terminal 10. As discussed below in greater detail, the broadcast voice instructional messages are coordinated with the movements of an animated character such that the animated character appears to be speaking the voice instructional messages.

The processing unit 26 includes network interface circuitry (not shown) which conventionally permits the self-service checkout terminal 10 to communicate with the retailer's network 25 such as a LAN or WAN through a wired connection 51. The processing unit 26 communicates with the retailer's network 25 during the checkout procedure in order to obtain information, such as pricing information, associated with an item being scanned, weighed, or otherwise entered, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the retailer's network 25.

The processing unit 26 communicates with the terminal memory device 27 via a data bus 53. The terminal memory device 27 is provided to maintain an electronic transaction table which includes a record of the product information associated with each item that is scanned, weighed, or otherwise entered during the customer's use of the self-service checkout terminal 10. For example, if the customer scans a can of soup, an item-entered control signal is generated thereby causing the description of the soup and the pricing information associated therewith to be recorded in the transaction table in the terminal memory device 27. Similarly, if the customer weighs a watermelon with the product scale 12 and then enters a product lookup code associated with watermelon via the data input device 34, another item-entered control signal is generated thereby causing product information associated with the watermelon to likewise be recorded in the transaction table.

It should therefore be appreciated that the sum of each of the items recorded in the transaction table (1) minus any reductions (e.g. coupons), and (2) plus any applicable taxes is the amount that the customer pays for his or her transaction. Moreover, data stored in the transaction table is printed out on the printer 36 thereby generating a printed itemized list for the customer at the end of his or her transaction.

Figure 3:
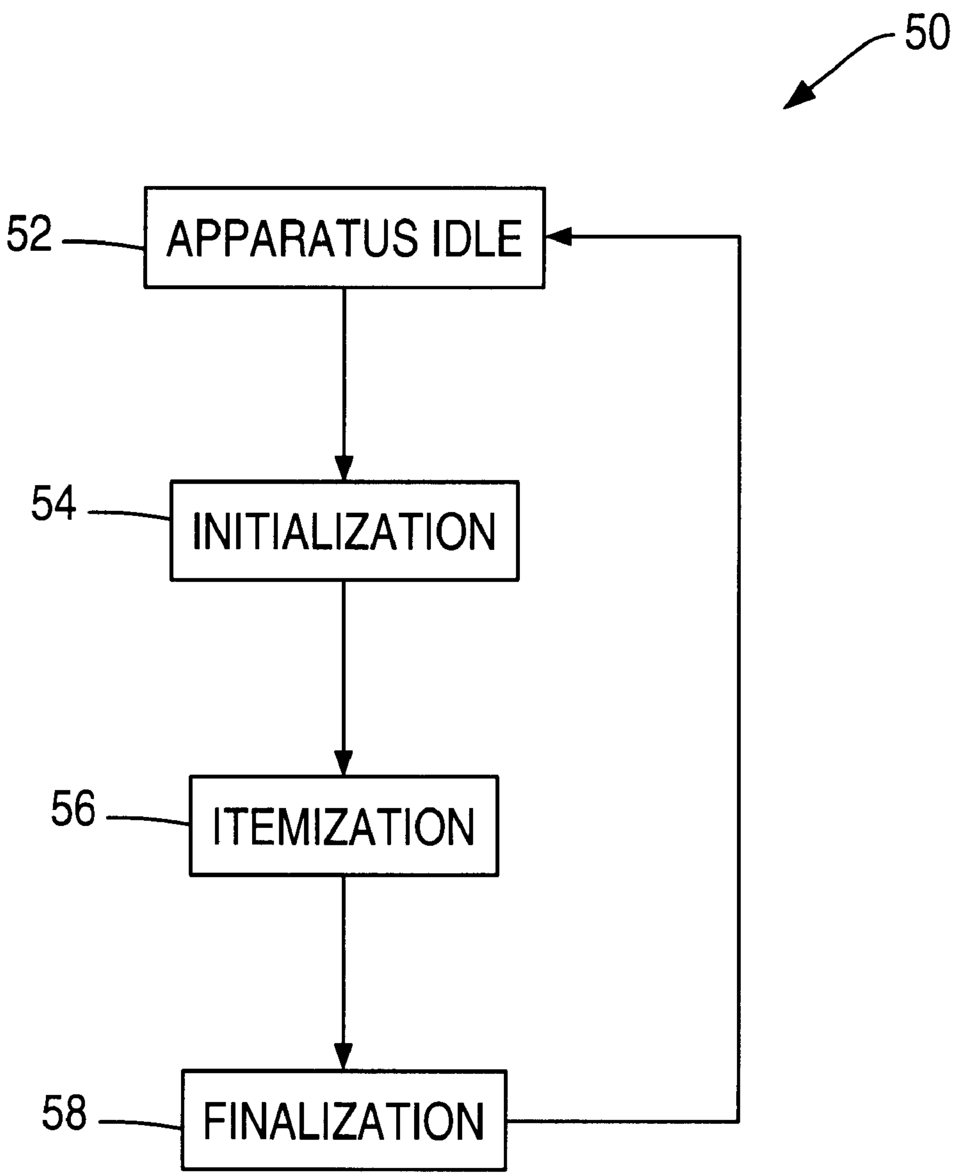
FIG. 3 is a flowchart setting forth a general procedure for checking out items through the self-service checkout terminal of FIG. 1.

Referring now to FIG. 3, there is shown a flowchart which sets forth a general procedure 50 for checking out items through the self-service checkout terminal 10. When the customer arrives at the self-service checkout terminal 10, the terminal 10 is in an idle state (step 52). An initialization step 54 is executed prior to checking out items for purchase. In particular, one or more initialization instructions are displayed on the display monitor 32 which instruct the customer to (1) touch a particular area of the display monitor 32 or push a particular button on the keypad 34 in order to select a desired method of payment, and/or (2) identify himself or herself by inserting a loyalty card, debit card, credit card, or smart card into the card reader 30.

At the completion of the initialization step 54, the procedure 50 advances to an itemization step 56 where the customer scans individual items for purchase across the scanner 14 with the product identification code facing one of the scanning windows 14*a* and 14*b*. Moreover, in step 56 the user may place an item on the product scale 12 in order to weigh the item and thereafter enter a product lookup code associated with the item via either the keypad 34 or by touching a particular area of the display monitor 32 if the product identification code printed on the item is not readable by the scanner 14 or if the item is too large or bulky to be scanned with the scanner 14. The customer may also enter an identification code associated with a coupon or voucher via either the scanner 14 (if the coupon or voucher has a bar code printed thereon), the keypad 34, or by touching a particular area of the display monitor 32.

At the completion of the itemization step 56, the procedure 50 advances to a finalization step 58 in which (1) payment is tendered by either inserting currency into a cash acceptor (not shown), charging a credit card or debit card account, or decreasing a value amount stored on a smart card via the card reader 30, and (2) a receipt in the form of an itemized list is printed by the printer 36. It should be appreciated that in the case of when a customer inserts currency into the cash acceptor, the self-service checkout terminal 10 may provide change via a currency dispenser (not shown) and a coin dispenser (not shown). After completion of the finalization step 58, the procedure 50 returns to step 52 in which the self-service checkout terminal 10 remains in the idle condition until a subsequent customer initiates a checkout procedure.

Figure 5:
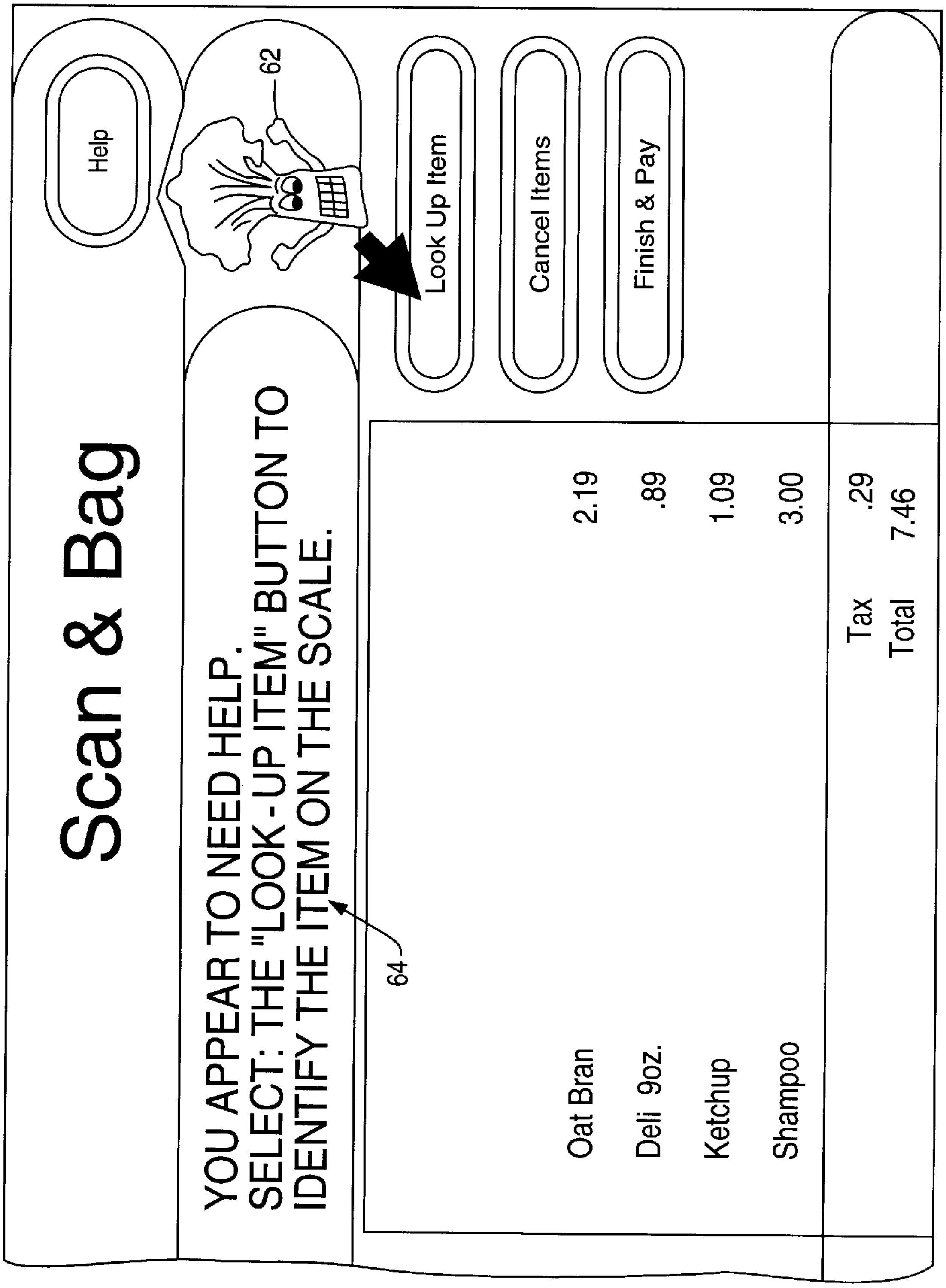
FIG. 5 shows a first embodiment of an exemplary help screen which may be displayed on the display monitor during operation of the self-service checkout terminal of FIG. 1.
Figure 6:
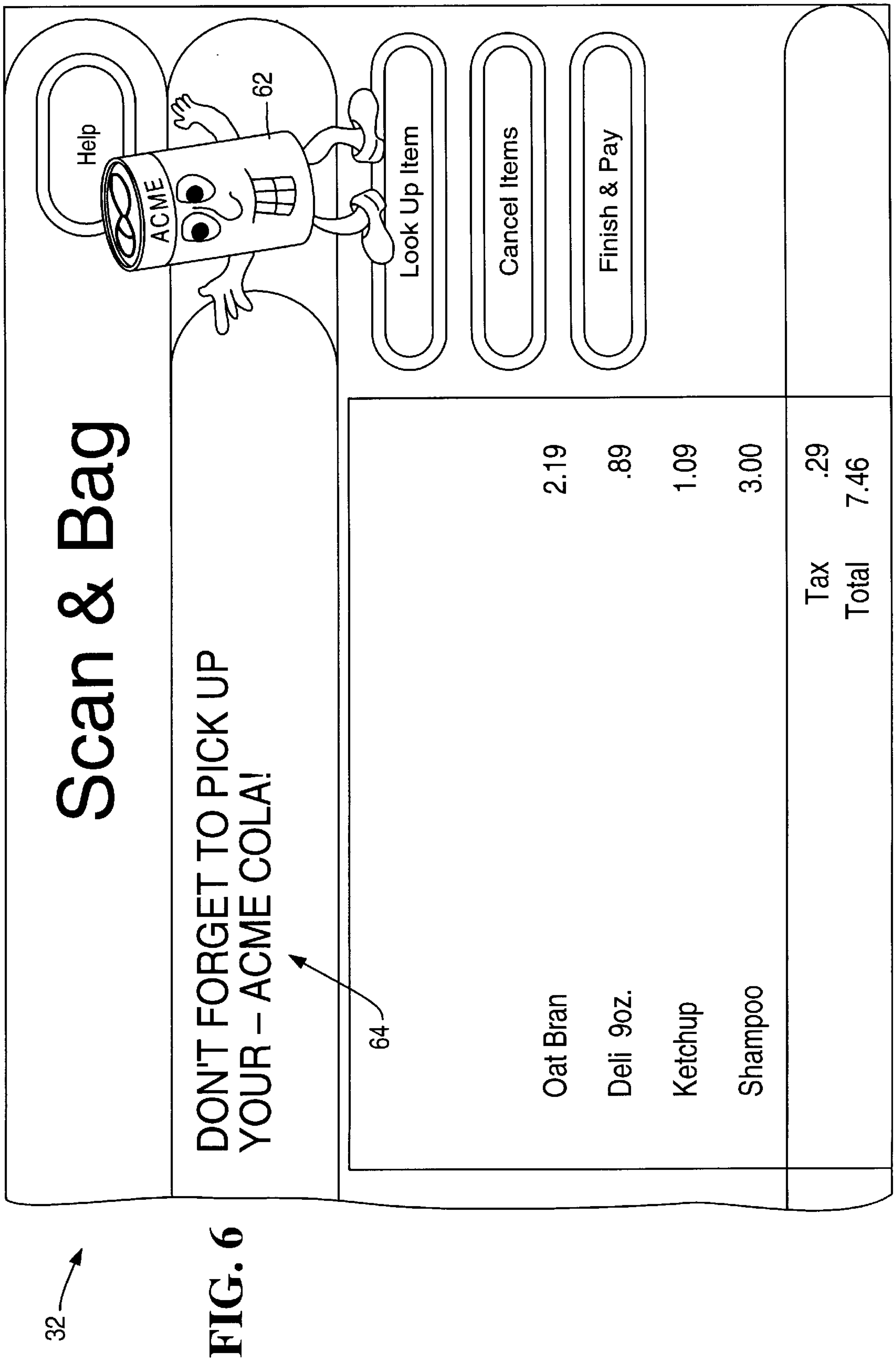
FIG. 6 is similar to FIG. 5, but showing a second embodiment of an exemplary display screen which may be displayed on the display monitor during operation of the self-service checkout terminal of FIG. 1.

During operation of the check out terminal 10 in the manner described above, assistance is provided to the user (e.g. the customer) by use of the display monitor 32. In particular, as shown in FIGS. 5 and 6, an instructional message having an animated character 62 may be displayed on the display monitor 32 in order to provide the necessary assistance to the customer operating the terminal 10. What is meant herein by the term "instructional message" is a message which instructs the user on operation of the checkout terminal. For example, the instructional message may instruct the customer to enter an item code (e.g. PLU code) associated with an item that the customer placed on the product scale 12. Moreover, what is meant herein by the term "animated character" is a visual representation or other image that personifies an inanimate object. The animated character may be manipulated as part of an animated sequence in order to perform a number of lifelike movements. For example, as shown in FIG. 5, the animated character may take the form of broccoli which is personified as a moving character.

The animated character 62 is a software-generated agent which may be configured to perform any number of lifelike movements and the like. For example, the animated character 62 may move his hands up and down or may smile at the customer. Moreover, the animated character 62 "communicates" with the customer operating the self-service checkout terminal 10 by use of a number of associated instructional text messages 64 which are displayed on the display monitor 32. What is meant herein by the term "associated instructional text message" is a text message which is displayed so as to create the appearance of being "said" by the animated character 62. For example, an associated instructional text message may be displayed as a text "balloon" in a similar manner to that in which text is displayed in a newspaper comic strip.

Moreover, the animated character 62 may "communicate" with the customer operating the self-service checkout terminal 10 by use of an associated instructional audio message. What is meant herein by the term "associated instructional audio message" is an audio message which is generated so as to create the appearance of being "said" by the animated character 62. For example, an associated instructional audio message may be embodied as a simulated voice in a manner similar to the manner in which voices in a cartoon television show simulate voices of characters displayed on the television screen. It should be appreciated that such simulated voices may be broadcast with the speakers 60 in order to allow the animated character 62 to "talk" to the customer.

The animated character 62 may be embodied to include a commercially recognizable image. What is meant herein by the term "commercially recognizable image" is any image or representation that an individual such as a customer would associate with a particular company, service, or commercial product. An example of the animated character being embodied as a commercially recognizable image is shown in FIG. 6 in which the character 62 is embodied as a lifelike can of cola with moving arms and a smiling face.

Moreover, the selection of the type of commercially recognizable image to be utilized in the makeup of the animated character 62 may be customized to individual customers based on information such as demographics (e.g. age or gender) and previous purchasing history. In particular, a customer profile containing customer-specific information about each customer such as demographic information (e.g. age, gender, etcetera) and purchasing history (e.g. a list of items which the customer previously purchased) may be stored in a customer profile database which is maintained in, for example, the terminal memory device 27 or a network memory device associated with the retailer's LAN or WAN 25. When a customer initiates a retail transaction by inserting his or her debit, credit, or loyalty card into the card reader 30, the customer's profile is retrieved from the profile database such that the customer-specific information contained therein may be utilized to customize the appearance of the animated character 62. For example, if a given customer's profile indicates that he or she routinely purchases ACME cola, the animated character 62 may be configured to take on the resemblance of the commercially recognizable image of an ACME cola can (as shown in FIG. 6).

Figure 4:
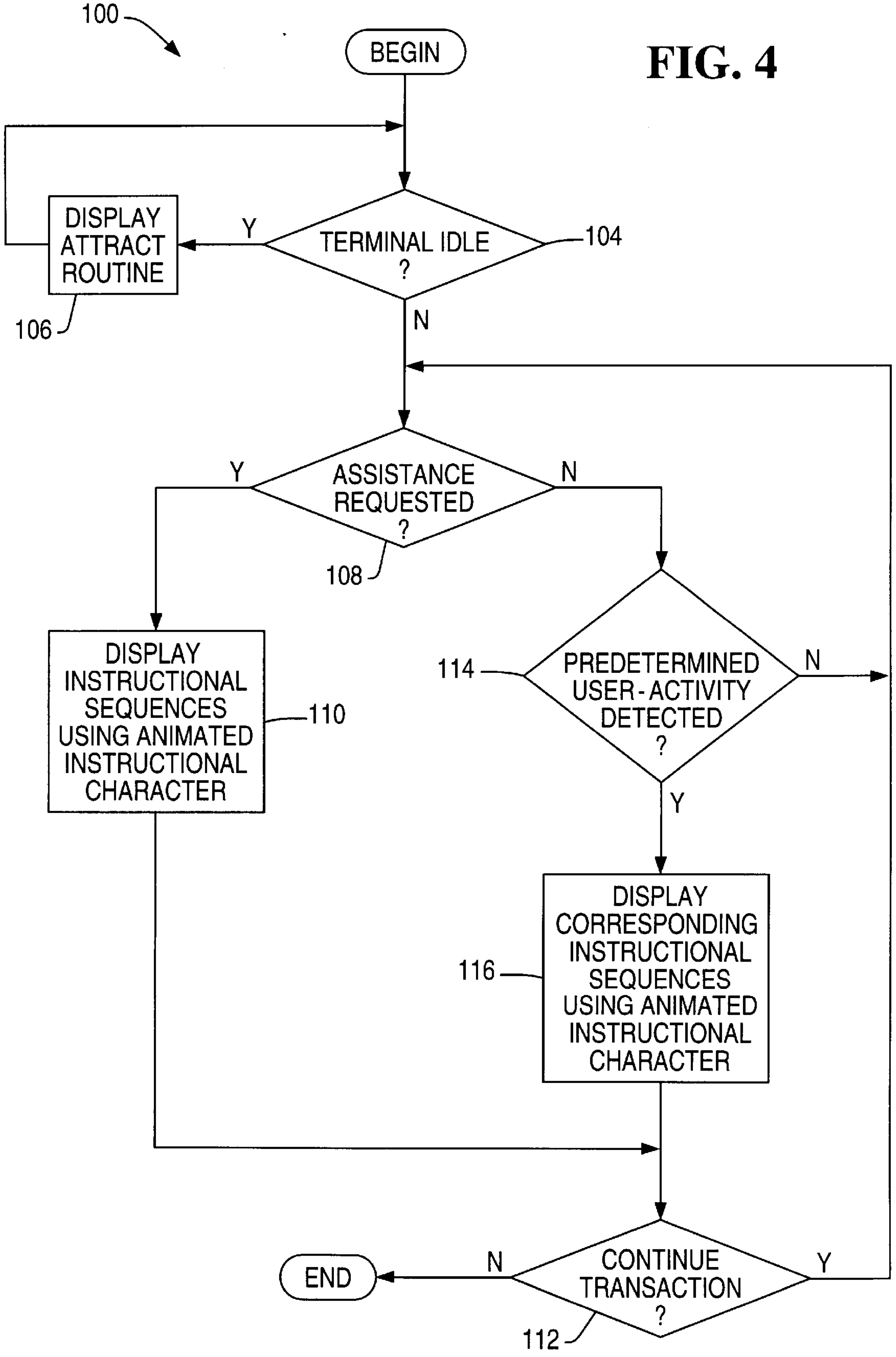
FIG. 4 is a flowchart which shows an instruction procedure for providing assistance to a customer during operation of the self-service checkout terminal of FIG. 1.

In order to provide assistance to customers operating the self-service checkout terminal 10, the terminal 10 executes an instruction routine 100 which is shown in FIG. 4. As shall be discussed below in greater detail, the instruction routine 100 may invoke the animated character 62 to provide assistance in the form of instruction to the customer at any time during the customer's checkout transaction.

The instruction routine 100 begins with step 104 in which the processing unit 26 determines whether the self-service checkout terminal 10 is idle. In particular, the processing unit 26 determines if a customer has initiated a checkout transaction in order to enter his or her items for purchase into the terminal 10. If the self-service checkout terminal 10 is presently idle, the instruction routine 100 advances to step 106. If the self-service checkout terminal 10 is not presently idle (i.e. a checkout transaction is currently in progress), the instruction routine 100 advances to step 108.

In step 106, an "attract routine" is performed on the display monitor 32 in order to attract potential users (e.g. customers) to the self-service checkout terminal 10. In particular, the processing unit 26 causes the animated character 62 to be displayed on the display monitor 32 in order to communicate a message such as an advertising message or an instructional message to the would be user (e.g. customer) in regard to commencing a checkout transaction with the self-service checkout terminal 10. During performance of such an attract routine, the instruction routine 100 continuously loops back to step 104 in order to determine if a customer subsequently initiates a checkout transaction.

As described above, once a customer initiates a checkout transaction, the instruction routine 100 advances to step 108. In step 108, the processing unit 26 determines if the customer has requested assistance. In particular, the processing unit 26 scans or reads the communication lines 43 and 49 in order to determine if the customer touched a particular location of the touch screen associated with the display monitor 32 or a particular key on the keypad 34 thereby indicating that the customer is in need of assistance. If the customer touches a particular location of the touch screen associated with the display monitor 32 or a particular key on the keypad 34 thereby indicating that the customer is in need of assistance, an assistance-needed control signal is generated and the instruction routine 100 advances to step 110. If the customer has not touched a particular location of the touch screen associated with the display monitor 32 or a particular key on the keypad 34, the instruction routine 100 advances to step 114.

In step 110, the animated character 62 is utilized to provide the requested assistance to the customer. In particular, the processing unit 26 displays an instructional message which includes an animated sequence performed by the animated character 62 in order to provide the necessary assistance to the customer. The instructional message may include both text and voice messages which are broadcast to the customer in order to convey the instructional message to the customer. It should be appreciated that the animated character 62 may guide the customer through a number of different display screens in order to provide the necessary assistance to the customer.

The instruction routine 100 then advances to step 112 in which the processing unit 26 determines whether or not to continue the customer's transaction. In particular, if subsequent to providing assistance to the customer, the customer operates, for example, the scanner 14 or the product scale 12 in a manner indicative of the customer continuing his or her retail transaction, the instruction routine 100 loops back to step 108 in order to monitor subsequent operation of the self-service checkout terminal 10. Alternatively, if the customer is not able to continue his or her transaction, the instruction routine 100 ends. It should be appreciated that in such a situation, the processing unit 26 may operate the status light device 11 or a paging device (not shown) in order to summon retail personnel to provide further assistance to the customer.

Returning now to step 108, if the customer has not touched a particular location of the touch screen associated with the display monitor 32 or a particular key on the keypad 34 in order to indicate that the customer is in need of assistance, the instruction routine 100 advances to step 114. In step 114, the processing unit 26 determines if the customer performs one of a number of predetermined user activities. What is meant herein by the term "user activity" is a predetermined activity performed by a user of the self-service checkout terminal 10 which is indicative of the user being in need or assistance or instruction in regard to operation of the terminal 10. In the case of a "customer activity", a customer is performing such an activity.

Examples of a user activity may include (1) activity by the customer or other user in which the checkout terminal 10 is unintentionally operated improperly, (2) activity by the customer or other user in which it can be inferred with a high degree of confidence that the checkout terminal 10 is intentionally operated improperly for illicit purposes such as theft, and (3) activity by the customer or other user which indicates that the customer is confused in regard to operation of the terminal 10. As a specific example, if the customer attempted to scan an item a number of times with the scanner 14, but the product identification code associated with the item was not read by the scanner 14, the processing unit 26 concludes that a user activity has occurred. Moreover, it should be appreciated that even if the product identification code associated with the item is entered, the processing unit 26 may determine that a user activity has occurred. For example, if the customer scanned a first item, but then placed a second item of greater value into a grocery bag (as detected by, for example, the bagwell scale 20), the processing unit 26 concludes that a user activity has occurred. For further example, if the customer or other user attempts to weigh an item such as produce with the product scale 12, but does not properly position the item on the product scale 12 or has not properly 'zeroed' the product scale 12, the processing unit 26 concludes that user activity has occurred.

Yet further examples of user activities may include (1) failure to surrender an item after the item has been voided, (2) weighing only a portion of an item (i.e. weighing only one banana, but placing four bananas into a grocery bag), and (3) placing an item into a grocery bag without first attempting to scan or otherwise enter the item. Moreover, if an excessive amount of time has elapsed since the last operation was performed by the customer or other user (e.g. since the last item was scanned), the processing unit 26 concludes that a user activity has occurred. It should be appreciated that the above-described examples of user activities are meant to be exemplary in nature and that any number or type of user activities may be monitored by the self-service checkout terminal 10 in order to fit the needs of a given terminal design or a given retailer's requirements.

In any event, if a predetermined user activity is detected in step 114, a user-activity control signal is generated and the instruction routine 100 advances to step 116. In step 116, the animated character 62 is utilized to provide the necessary assistance to the customer. In particular, the processing unit 26 displays an instructional message which includes an animated sequence performed by the animated character 62 in order to provide the necessary assistance to the customer. The instructional message may include both text and voice messages which are broadcast to the customer in order to convey the instructional message to the customer. For example, as shown in FIG. 5, if the processing unit 26 determines that the customer placed an item on the product scale 12, but has yet to enter the corresponding item code (e.g. PLU code) associated with the item into the terminal 10, the animated character 62 (which in this case is embodied to resemble broccoli) may be utilized to instruct the customer on how to enter the necessary item code. It should be appreciated that the animated character 62 may guide the customer through a number of different display screens in order to provide the necessary assistance to the customer.

The instruction routine 100 then advances to step 112 in which the processing unit 26 determines whether or not to continue the customer's transaction. In particular, as described above, if subsequent to providing assistance to the customer, the customer operates, for example, the scanner 14 or the product scale 12 in a manner indicative of the customer continuing his or her retail transaction (or in the case of the above-described example, inputs the necessary item code associated with the item positioned on the product scale 12), the instruction routine 100 loops back to step 108 in order to monitor subsequent operation of the self-service checkout terminal 10. Alternatively, if the customer is not able to continue his or her transaction, the instruction routine 100 ends. It should be appreciated that in such a situation, the processing unit 26 may operate the status light device 11 or a paging device (not shown) in order to summon retail personnel to provide further assistance to the customer.

Hence, as described above, use of the animated character 62 provides numerous advantages to the self-service checkout terminal 10 relative to checkout terminals 10 which have heretofore been designed. For example, use of animated character 62 provides a "user-friendly" interface between the customer and the terminal 10 thereby increasing the likelihood that new or inexperienced customers will operate the terminal 10. Moreover, use of the animated character 62 provides a direct marketing channel to the customer when the character 62 is embodied as a commercially recognizable image. In addition, the retailer is likely to recognize an additional source of revenue from selling such advertising to product manufacturers.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

There are a plurality of advantages of the present invention arising from the various features of the checkout terminal described herein. It will be noted that alternative embodiments of the checkout terminal of the present invention may not include all of the features described yet still benefit from at least some of the advantages of such features. Those of ordinary skill in the art may readily devise their own implementations of a checkout terminal that incorporate one or more of the features of the present invention and fall within the spirit and scope of the present invention as defined by the appended claims.

For example, although the concepts of the present invention are herein described as being utilized in conjunction with the self-service checkout terminal 10, and has significant advantages thereby in the present invention, it should be appreciated that certain of such advantages may be realized by use of the concepts of the present invention in conjunction with other types of retail terminals. For example, the animated character 62 may be utilized to provide assistance to a retail checkout clerk or the like who is operating an assisted or "clerk-operated" checkout terminal. Such use of the animated character 62 would be particularly useful for assisting new or relatively inexperienced checkout clerks.

What is claimed is:

1. A method of operating a retail terminal having a display monitor associated therewith, comprising the steps of:

generating an item-entered control signal when a user enters an item for purchase into said retail terminal during a retail transaction;

entering a record corresponding to said item for purchase into an electronic transaction table in response to generation of said item-entered control signal; and generating an instructional message which instructs said user on operation of said retail terminal during said retail transaction, wherein said instructional message generating step includes the step of displaying an animated character and an associated instructional text message with said display monitor during said retail transaction.

2. The method of claim 1, wherein:

said animated character is configured to resemble a commercially recognizable image, and said displaying step further includes the step of displaying said animated character so as to communicate said commercially recognizable image to said user with said display monitor.

3. The method of claim 1, wherein:

said animated character is configured to resemble a product for purchase, and said displaying step includes the step of displaying said animated character so as to advertise said product for purchase to said user with said display monitor.

4. The method of claim 1, wherein said displaying step includes the step of displaying said animated character in a manner which is representative of said animated character performing a number of lifelike movements.

5. The method of claim 1, wherein:

said retail terminal further includes a speaker assembly, and said instructional message generating step further includes the step of generating a number of lifelike sounds with said speaker assembly during said animated character displaying step.

6. The method of claim 1, further comprising the step of determining if said user operates an input device associated with said retail terminal so as to request assistance in regard to operation of said retail terminal and generating an assistance-needed control signal in response thereto, wherein:

said displaying step includes the step of displaying said instructional message so as to provide assistance to said user in response to generation of said assistance-needed control signal.

7. The method of claim 1, further comprising the step of detecting a predetermined user activity associated with operation of the terminal by said user and generating a user-activity control signal in response thereto, wherein:

said displaying step includes the step of displaying said instructional message so as to provide a specific instruction associated with said predetermined user activity to said user in response to generation of said user-activity control signal.

8. A retail terminal, comprising:

a display monitor;

a scanner for allowing a user to enter an item for purchase into said retail terminal;

a processing unit electrically coupled to both said display monitor and said scanner;

a memory device electrically coupled to said processing unit, said memory device having stored therein a plurality of instructions which, when executed by said processing unit, causes said processing unit to:

(a) generate an item-entered control signal when said user enters said item for purchase into said retail terminal during a retail transaction, (b) enter a record corresponding to said item for purchase into an electronic transaction table in response to generation of said item-entered control signal, and (c) generate an instructional message which instructs said user on operation of said retail terminal during said retail transaction, wherein said instructional message includes an animated character and an associated instructional text message which are displayed with said display monitor during said retail transaction.

9. The retail terminal of claim 8, wherein said animated character is configured to resemble a commercially recognizable image, and said plurality of instructions, when executed by said processing unit, further causes said processing unit to display said animated character so as to communicate said commercially recognizable image to said user with said display monitor.

10. The retail terminal of claim 8, wherein:

said animated character is configured to resemble a product for purchase, and said plurality of instructions, when executed by said processing unit, further causes said processing unit to display said animated character so as to advertise said product for purchase to said user with said display monitor.

11. The retail terminal of claim 8, wherein said plurality of instructions, when executed by said processing unit, further causes said processing unit to display said animated character in a manner which is representative of said animated character performing a number of lifelike movements.

12. The retail terminal of claim 8, further comprising a speaker assembly, wherein said plurality of instructions, when executed by said processing unit, further causes said processing unit to generate a number of lifelike sounds with said speaker assembly contemporaneously with display of said animated character with said display monitor.

13. The retail terminal of claim 8, further comprising an input device for receiving input from said user, wherein said plurality of instructions, when executed by said processing unit, further causes said processing unit to:

(a) determine if said user operates said input device associated with said retail terminal so as to request assistance in regard to operation of said retail terminal and generate an assistance-needed control signal in response thereto, and (b) display said instructional message so as to provide assistance to said user in response to generation of said assistance-needed control signal.

14. The retail terminal of claim 8, wherein said plurality of instructions, when executed by said processing unit, further causes said processing unit to:

(a) detect a predetermined user activity associated with operation of said terminal by said user and generate a user-activity control signal in response thereto, and (b) display said instructional message so as to provide a specific instruction associated with said predetermined user activity to said user in response to generation of said user-activity control signal.

15. A method of operating a self-service checkout terminal having a display monitor associated therewith, comprising the steps of:

generating an item-entered control signal when a customer enters an item for purchase into said self-service checkout terminal during a retail transaction;

entering a record corresponding to said item for purchase into an electronic transaction table in response to generation of said item-entered control signal; and generating an instructional message which instructs said customer on operation of said self-service checkout terminal during said retail transaction, wherein (i) said message generating step includes the step of displaying an animated character and an associated instructional text message with said display monitor during said retail transaction, and (ii) said animated character is configured to resemble a commercially recognizable image so as to communicate said commercially recognizable image to said customer with said display monitor.

16. The method of claim 15, wherein:

said animated character is further configured to resemble a product for purchase, and said displaying step includes the step of displaying said animated character so as to advertise said product for purchase to said customer with said display monitor.

17. The method of claim 15, wherein said displaying step includes the step of displaying said animated character in a manner which is representative of said animated character performing a number of lifelike movements.

18. The method of claim 15, wherein:

said self-service checkout terminal further includes a speaker assembly, and said instructional message generating step further includes the step of generating a number of lifelike sounds with said speaker assembly during said animated character displaying step.

19. The method of claim 15, further comprising the step of determining if said customer operates an input device associated with said self-service checkout terminal so as to request assistance in regard to operation of said self-service checkout terminal and generating an assistance-needed control signal in response thereto, wherein:

said displaying step includes the step of displaying said instructional message so as to provide assistance to said customer in response to generation of said assistance-needed control signal.

20. The method of claim 15, further comprising the step of detecting a predetermined customer activity associated with operation of the terminal by said customer and generating a customer-activity control signal, wherein:

said displaying step includes the step of displaying said instructional message so as to provide a specific instruction associated with said customer activity to said customer in response to generation of said customer-activity control signal.

21. A method of operating a retail terminal having a display monitor associated therewith, comprising the steps of:

generating an item-entered control signal when a user enters an item for purchase into said retail terminal during a retail transaction;

entering a record corresponding to said item for purchase into an electronic transaction table in response to generation of said item-entered control signal; and generating an instructional message which instructs said user on operation of said retail terminal during said retail transaction, wherein said instructional message generating step includes the steps of (i) displaying an animated character with said display monitor during said retail transaction, and (ii) generating an associated instructional audio message during said animated character displaying step.

22. The method of claim 21, wherein:

said animated character is configured to resemble a commercially recognizable image, and said displaying step further includes the step of displaying said animated character so as to communicate said commercially recognizable image to said user with said display monitor.

23. The method of claim 21, wherein:

said animated character is configured to resemble a product for purchase, and said displaying step includes the step of displaying said animated character so as to advertise said product for purchase to said user with said display monitor.

* * * * *